CIRCUIT ARRANGEMENT FOR DETERMINING THE POLARITY OF PULSES

Filed Nov. 10, 1958

2 Sheets-Sheet 1

INVENTORS
Joachim Schulze
Günter Laskowski

INVENTORS
Joachim Schulze
Günter Laskowski 2,978,687
Patented Apr. 4, 1961

2,978,687

CIRCUIT ARRANGEMENT FOR DETERMINING THE POLARITY OF PULSES

Joachim Schulze, Limbach-Oberfrohna, and Günter Laskowski, Rochlitz, Germany, assignors to VEB Elektronische Rechenmaschinen-Wissenschaftlicher Industriebetrieb-Karl-Marx-Stadt, Karl-Marx-Stadt, Germany Filed Nov. 10, 1958, Ser. No. 773,059

7 Claims. (Cl. 340—174.1)

The invention pertains to a circuit arrangement that makes it possible to distinguish the polarity of pulses, especially of those recorded on magnetizable material.

Processes are known for recording and reproduction of pulses employing magnetizable materials, in which the current pulses to be stored are fed into magnetic recording heads, which magnetize the carrier material, which moves so that the polarization occurs over a certain distance. Switching to the desired magnetizing state is effected by mechanical contacts or by electronic flip-flop circuits, which themselves are controlled by pulses. The windings of the recording heads are connected into the plate circuits of the flip-flop tubes. The circuit operates so as to reverse the direction of magnetic flux in the air gap of the recording head by switching the circuit from one stable position to the other. Another type of recording involves the position of two windings on the core of the magnetic head. These windings are then connected to the plates of a bistable flip-flop circuit or to appropriate contacts of a mechanical reversing switch, to reverse the direction of flux in the air gap. The windings are often not fed directly from the flip-flop tubes, but through power amplifiers. The pulses recorded on the carrier material are either positive or negative. When reading with a magnetic head, they differ as a result of the differentiating action of the magnetic head only in that the positive branch of the pulse appears first in the case of positive pulses, followed by the negative. In the case of negative pulses, the negative pulse branch appears first, followed by the positive. It is, therefore, difficult to secure electric discrimination between these two types of pulses. Various processes are known that make such discrimination possible. The simplest discrimination is effected by integration, employing an R–C circuit. But this procedure suffers from the disadvantage that much of the amplitude is lost. A gate circuit has also become known, which operates in such a way that a negative pulse branch reverses a monostable multivibrator, and then keeps a gate closed for a certain period of time, so that the next positive pulse branch can no longer pass the gate. A positive pulse branch can pass through the gate only if it occurs before the negative pulse branch. The positive pulse branches can thus be evaluated as required.

What distinguishes the circuit arrangement of the invention from these known circuits is the fact that a double control tube is so connected that the differentiated pulses are fed directly to one control grid of the double control tube, and that the second control grid receives the same impulse through a rectifier, which is connected so as to pass negative pulses, and that a capacitance and a resistance are provided in parallel with the second control grid to store the negative charge for a definite period of time.

The invention is illustrated in the embodiments shown in the drawing.

Figure 1:
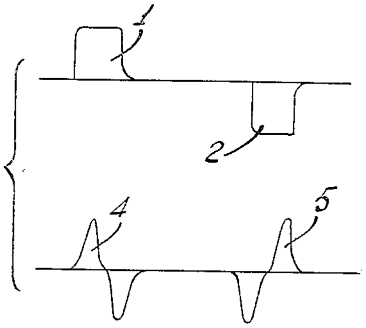
Fig. 1 is a schematic diagram of a positive and a negative recorded pulse, as given by the magnetization of a magnetic medium. Below it, there is shown the differentiated pulse detectable as a voltage or current curve at the reading head.

Referring to the drawing, both positive pulses 1 and negative pulses 2 are recorded on any magnetic medium. The magnetizations are converted into differentiated pulses 4 and 5 in the monitoring head 3. These pulses are amplified to a voltage amplitude of some 6 volts in an amplifier 6. It is advisable to choose the number of amplification stages so that the phase shift of the pulses meets the requirements of employing the originally positive or originally negative pulse after selection. The amplified and possibly phase-inverted pulses 7 are then fed to the inventive circuit. If the first pulse branch is positive, it is fed to the control grid 13 via the capacitor 8, so that the tube 11, which is normally blocked by the bias $-U_g$ applied through a resistor to grid 13, becomes a conductor for the duration of the positive branch of the pulse. The potential of the second control grid 12 remains at zero as the rectifier 9 is blocked for the positive branch. If the first pulse branch of 7 is negative, the capacitor 10, and hence the control grid 12, are charged negatively. The charge is dissipated through the resistance 14. The subsequent positive branch of the pulse, therefore, cannot put tube 11 in the conducting state, as it is still blocked by the negative charge on grid 12. The R–C section 10, 14 should be so dimensioned that the charge on grid 12 blocks tube 11 until the next positive branch of the pulse has passed. Thus we secure at the output end of tube 11 the pulses shown at 15, i.e. only positive, differentiated pulses put tube 11 in the conducting state. The pulses are then evaluated in any network 16. If negative pulses are to be evaluated, the phase shift of the amplifier 6 should be dimensioned accordingly.

Figure 4:
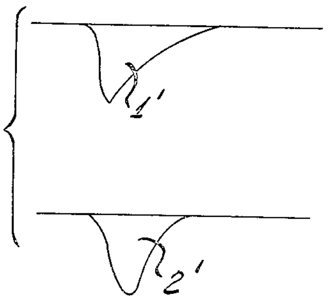
Fig. 4 shows the voltage curve when an R–C circuit is used and the voltage curve when an R–L–C oscillatory circuit is used.
Figure 2:
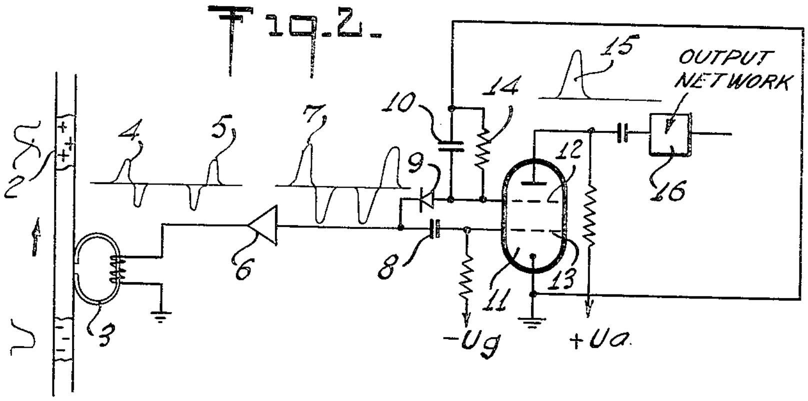
Fig. 2 is a preferred circuit for a low pulse time ratio.
Figure 3:
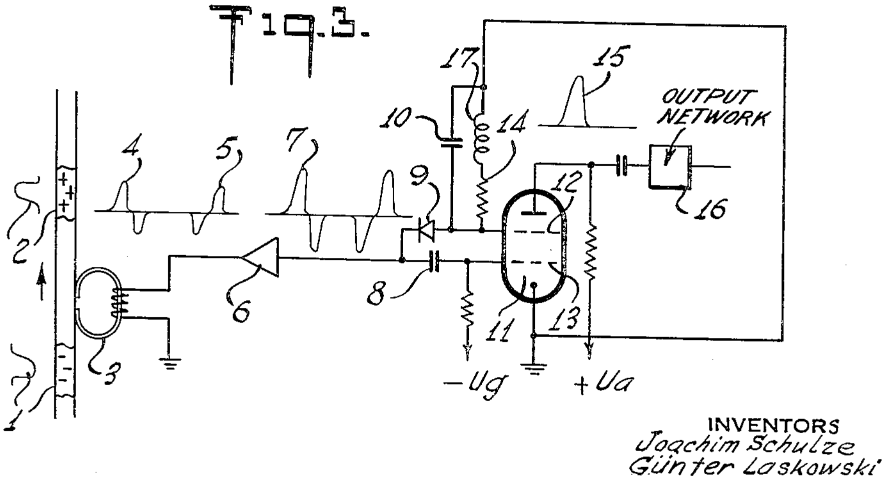
Fig. 3 is a circuit for a higher pulse time ratio.

For a higher pulse-to-space time ratio, it is advisable to employ a circuit like the one shown in Fig. 3. Storage then does not take place in an R–C section, but in an oscillatory R–L–C circuit 10, 17, 14 whose attenuation is such as to approach the aperiodic limiting case. Since at the time $t=0$, we also have $i=0$, the charge is held at a high potential for a longer time, on the one hand, while, on the other hand, the decay of the voltage is steeper than with the R–C section. The curves of the voltage impressed on the control grid 12 are shown in Fig. 4. The voltage curve 1′ applies to the use of an R–C section 10, 14, as shown in Fig. 2, whereas the voltage curve 2′ applies to the R–L–C oscillatory circuit 10, 17, 14 shown in Fig. 3.

Figure 5:
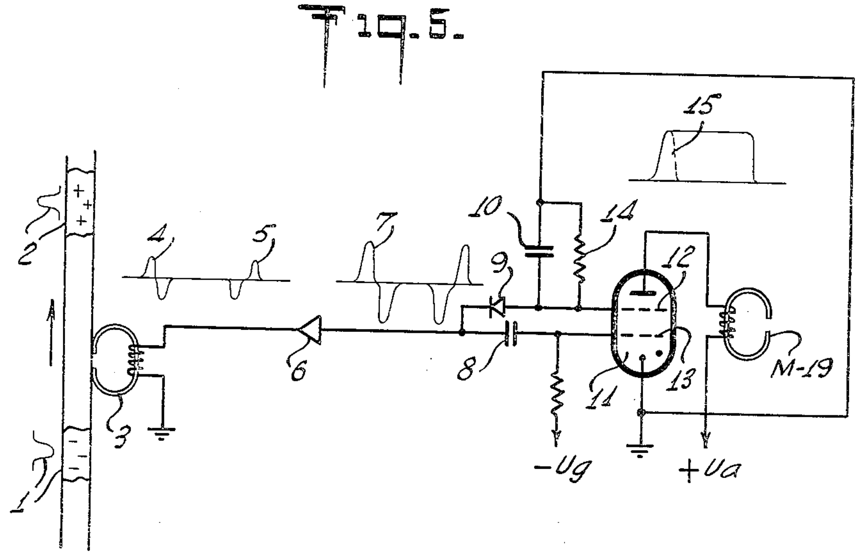
Fig. 5 is a circuit arrangement including a double-grid thyratron.
Figure 6:
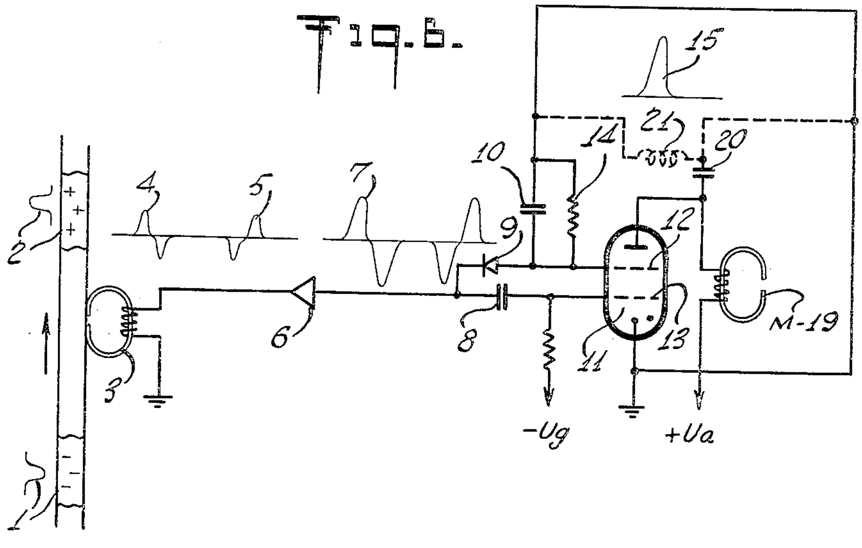
Fig. 6 is a circuit in which the thyratron is ignited as shown in Fig. 5, a capacitor being used for automatic deionization.

The circuit of Fig. 5 is similar to the circuit of Fig. 2, but the circuit 10, 14 is employed to control a double-grid thyratron tube 11. The circuit of Fig. 5 is intended to select the pulses in such a manner that the first positive pulse 4 or 7 ignites the thyratron tube, the tube being deionized after the end of a program by the interruption of the plate voltage. In the circuit shown in Fig. 6, the thyratron tube 11 is ignited exactly as described above for Fig. 5. Deionization, however, is automatically produced through a capacitor 20. It is also possible to employ a deionizing circuit, consisting of a capacitor 20 and an inductance 21 for automatic deionization instead of the capacitor 20 alone. Such an arrangement produces reignition of the thyratron tube for every positive pulse, after which it is automatically deionized. If the thyratron tube is to respond to negative pulses, for example, the number of stages in the amplifier 6 should be dimensioned accordingly. The outputs of the circuits of Figs. 5 and 6 may be impressed on magnets or magnetic heads 19.

What is claimed is:

1. A circuit for determining the polarity of magnetically recorded pulses comprising a magnetic reading head which differentiates said pulses during reproduction, an electron tube having an anode, a cathode and at least two control grids, an input circuit connecting said magnetic head to said control grids, said input circuit comprising a rectifier connected between said magnetic head and one control grid with the anode of the rectifier connected to said control grid, a storage circuit including a capacitor connected in parallel with a resistor, the storage circuit having one terminal connected to a point between said rectifier and said control grid and having its other terminal connected to the cathode, and a capacitor connecting said magnetic head to the other of said control grids, means for applying a negative biasing potential to said other grid, said storage circuit having a time constant sufficiently long to maintain said tube blocked in response to a negative input pulse for a sufficient time to prevent response of said tube to the immediately following positive pulse resulting from differentiation by the magnetic head, whereby said tube responds to a positive pulse only if said positive pulse is not preceded immediately by a negative pulse within an interval determined by the time constant of said storage circuit.

2. A circuit according to claim 1 wherein said storage circuit includes an inductor connected in series with said resistor.

3. A circuit according to claim 1 wherein the time constant of said storage circuit is of such size that a negative charge therein decays substantially completely immediately before the occurrence of the next recorded pulse.

4. A circuit according to claim 1 wherein said electron tube is a gas discharge tube.

5. A circuit according to claim 4 including a magnetic recording head connected between the cathode and anode of said tube.

6. A circuit according to claim 4, including circuit means connected between the anode and cathode for deionizing said tube and rendering it non-conductive.

7. A circuit according to claim 1 including means for rendering said circuit responsive to recorded pulses of a selected polarity, said means including an amplifier having a correspondingly selected member of stages connected between the magnetic head and said input circuit.

References Cited in the file of this patent

UNITED STATES PATENTS

| | | |
|---|---|---|
| 2,706,810 | Jacobsen | Apr. 19, 1955 |
| 2,862,199 | Scott | Nov. 25, 1958 |